US009962014B2

(12) United States Patent
Sparks

(10) Patent No.: US 9,962,014 B2
(45) Date of Patent: May 8, 2018

(54) HOLDER FOR A REFRIGERATED CASE

(71) Applicant: Zero Zone, Inc., North Prairie, WI (US)

(72) Inventor: Robert Sparks, Mukwonago, WI (US)

(73) Assignee: Zero Zone, Inc., North Prairie, WI (US)

(*) Notice: Subject to any disclaimer, the term of this patent is extended or adjusted under 35 U.S.C. 154(b) by 68 days.

(21) Appl. No.: 15/088,875

(22) Filed: Apr. 1, 2016

(65) Prior Publication Data

US 2017/0280897 A1  Oct. 5, 2017

(51) Int. Cl.
B01D 50/00 (2006.01)
B01D 46/12 (2006.01)
B01D 46/24 (2006.01)
A47F 3/04 (2006.01)
F16L 11/18 (2006.01)
F25D 23/00 (2006.01)
H02G 11/00 (2006.01)
F25D 17/06 (2006.01)
F25D 23/08 (2006.01)
F25D 27/00 (2006.01)
B01D 46/00 (2006.01)

(52) U.S. Cl.
CPC .......... A47F 3/0482 (2013.01); A47F 3/0408 (2013.01); A47F 3/0443 (2013.01); B01D 46/0005 (2013.01); B01D 46/2418 (2013.01); F25D 17/06 (2013.01); F25D 23/08 (2013.01); F25D 27/00 (2013.01); F25D 2317/067 (2013.01)

(58) Field of Classification Search
CPC ........ B01D 50/00; B01D 46/12; B01D 46/24; F25D 17/06; F25D 23/00; H02G 11/00; H02G 11/006; F16L 11/18; A47F 3/04
USPC .......................... 55/385.1; 62/419, 246, 264
See application file for complete search history.

(56) References Cited

U.S. PATENT DOCUMENTS 3,139,737 A * 7/1964 Wile ..................... A47F 3/0452
62/256
3,304,740 A 2/1967 Dickson et al.
(Continued)

FOREIGN PATENT DOCUMENTS

CN 201814220 5/2011
CN 103759487 5/2014
(Continued)

Primary Examiner — Frank Lawrence, Jr.
Assistant Examiner — Minh-Chau Pham
(74) Attorney, Agent, or Firm — Michael Best & Friedrich LLP

(57) ABSTRACT

A refrigerated case includes a case body including a top panel, a rear panel, and a bottom that cooperate to define a display space, a portion of a refrigeration system disposed in the case and operable to cool a flow of air, and a first air passage positioned to direct the flow of air near the top panel from the rear panel generally toward a front of the case. A one piece holder is positioned to receive the flow of air adjacent the front of the case, the one piece holder formed as a unitary component using a PVC foam material and arranged to accelerate and redirect the flow of air in a downward direction toward the bottom, and a filter member is at least partially supported by the holder and positioned to receive the flow of air in the downward direction and to redirect that flow into the display space.

18 Claims, 3 Drawing Sheets

(56) References Cited

U.S. PATENT DOCUMENTS

| | | | |
|---|---|---|---|
| 4,117,697 A | 10/1978 | Myers et al. | |
| 4,404,816 A * | 9/1983 | Ibrahim | F25D 21/125 |
| | | | 62/282 |
| 4,807,446 A | 2/1989 | Sunaga | |
| 4,938,034 A | 7/1990 | Rosanio et al. | |
| 6,094,932 A | 8/2000 | Chiappetta | |
| 6,104,399 A | 8/2000 | Volkel | |
| 6,471,192 B1 | 10/2002 | Erwin | |
| 6,761,641 B2 | 7/2004 | Martin et al. | |
| 8,468,844 B2 | 6/2013 | Nagel et al. | |
| 2005/0284113 A1* | 12/2005 | Jang | B01D 46/0006 |
| | | | 55/385.1 |
| 2006/0032256 A1* | 2/2006 | LaRose, Jr. | A47F 3/0434 |
| | | | 62/246 |
| 2006/0123747 A1* | 6/2006 | Gunderson | F25D 17/042 |
| | | | 55/385.1 |
| 2004/0281601 | 12/2007 | Hammonds | |
| 2008/0122324 A1* | 5/2008 | Bienick | E05D 7/1011 |
| | | | 312/116 |
| 2010/0199706 A1* | 8/2010 | Bischofberger | F25D 17/042 |
| | | | 62/419 |
| 2014/0260395 A1 | 9/2014 | Grill | |
| 2017/0150829 A1* | 6/2017 | Bates | A47F 3/0447 |

FOREIGN PATENT DOCUMENTS

| | | |
|---|---|---|
| WO | 2011055037 | 5/2011 |
| WO | 2014167320 | 10/2014 |

* cited by examiner

HOLDER FOR A REFRIGERATED CASE

BACKGROUND

The invention relates to honeycomb holders for refrigerated cases, and more particularly to honeycomb holders that are formed from PVC foam.

Refrigerated cases often include a refrigeration system arranged to circulate cooling air within the case. In some designs the case is arranged to direct the cold air downward through a filtering device and into the case.

SUMMARY

In one construction, a refrigerated case includes a case body including a top panel, a rear panel, and a bottom that cooperate to define a display space, a portion of a refrigeration system disposed in the case and operable to cool a flow of air, and a first air passage positioned to direct the flow of air near the top panel from the rear panel generally toward a front of the case. A one piece holder is positioned to receive the flow of air adjacent the front of the case, the one piece holder formed as a unitary component using a PVC foam material and arranged to accelerate and redirect the flow of air in a downward direction toward the bottom, and a filter member is at least partially supported by the holder and positioned to receive the flow of air in the downward direction and to redirect that flow into the display space.

In another construction, a refrigerated case includes a case body including a top panel, a rear panel, and a bottom that cooperate to define a display space, a portion of a refrigeration system disposed in the case and operable to cool a flow of air, and a first air passage positioned to direct the flow of air near the top panel from the rear panel generally toward a front of the case. A PVC foam holder member is formed as a single unitary member and including a pocket portion, a substantially vertical surface and an angled surface arranged at an opaque angle with respect to the substantially vertical surface, the angled surface arranged to accelerate and redirect the flow of air in a downward direction toward the bottom, and a filter member at least partially disposed within the pocket and partially supported by the holder, the filter member positioned to receive the flow of air in the downward direction and to redirect that flow into the display space.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
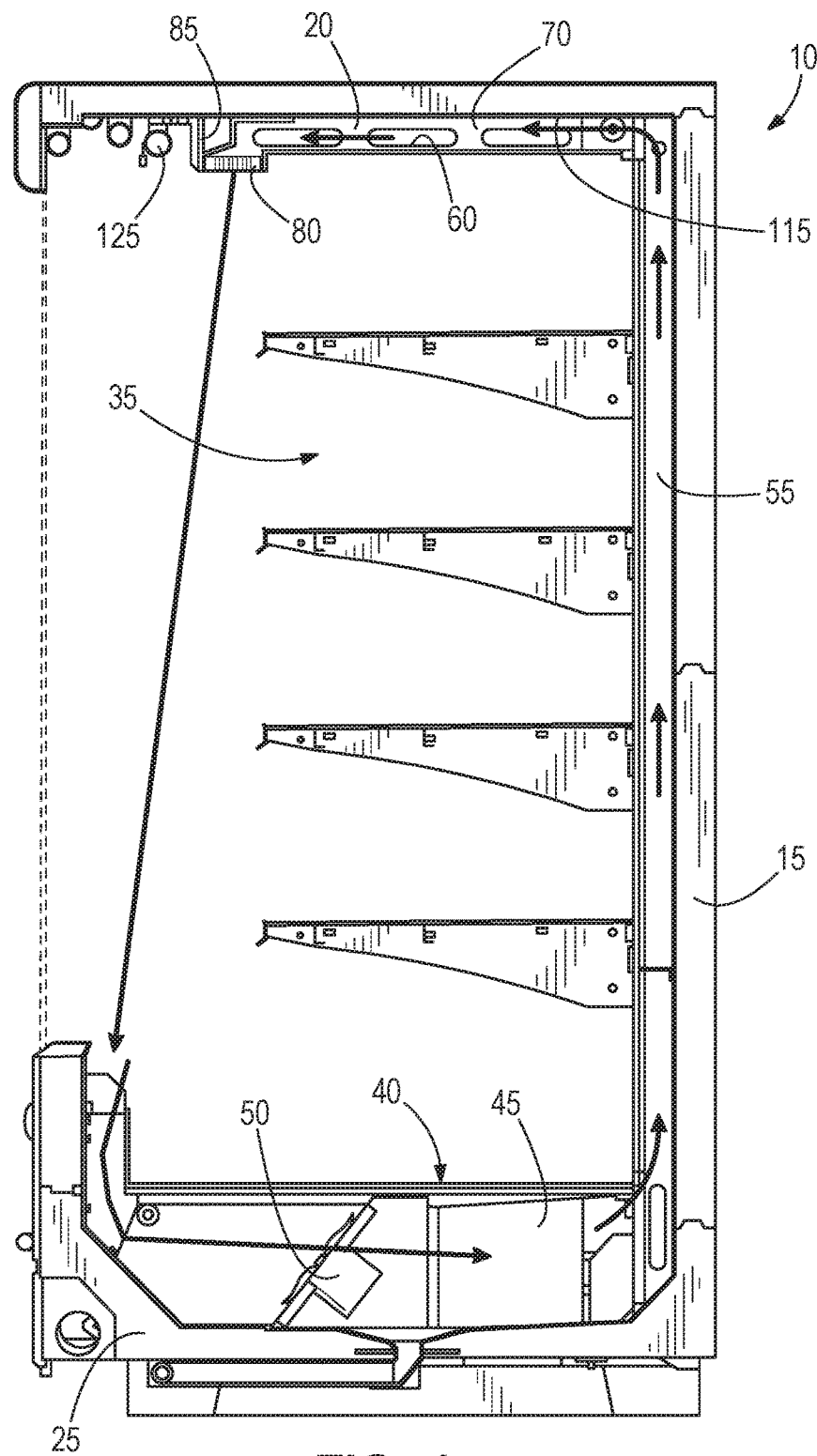
FIG. 1 is a side cross sectional view of a refrigerated case.

FIG. 1 is a side view of a refrigerated display case 10 of the type often used in large grocery stores as well as small convenience stores. The case 10 includes a rear panel 15, a top panel 20, a bottom 25, and sides 30 that define a display space 35. Some cases 10 may include doors that allow for the closing of the front with other cases 10 being open.

Each case 10 typically includes a refrigeration system 40 or at least a portion of a refrigeration system 40 that allows for the cooling of the air within the display space 35. In preferred arrangements, each case 10 includes at least an evaporator 45 of a refrigeration system 40 to provide for the cooling of the air. With reference to FIG. 1, the illustrated construction includes the evaporator 45 disposed in the bottom 25 of the display case 10 and a fan 50 positioned to direct air into the evaporator 45.

As illustrated in FIG. 1, the fan 50 produces a recirculating flow of air within the case 10. The rear panel 15 defines a first flow path 55 that receives the cooled air from the outlet of the evaporator 45 and directs the flow upward to the top panel 20. A second flow path 60 is defined in the top panel 20 o direct the air toward the front of the case 10 and to direct the air downward to cool the product being displayed. As the air travels downward, it cools the product and is heated. The warm return air is drawn into the bottom 25 of the case 10 by the fan 50 to repeat the cooling cycle.

Figure 2:
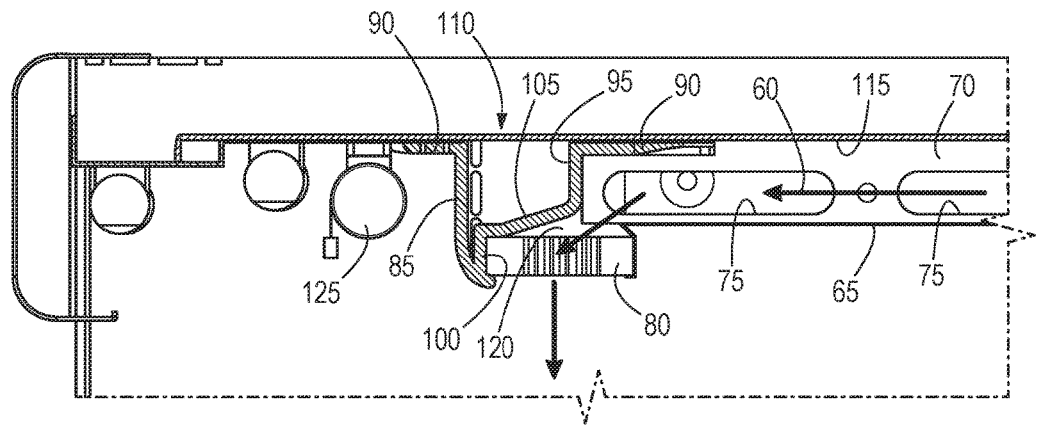
FIG. 2 is an enlarged side view of a portion of the case of FIG. 1 including a holder.
Figure 3:
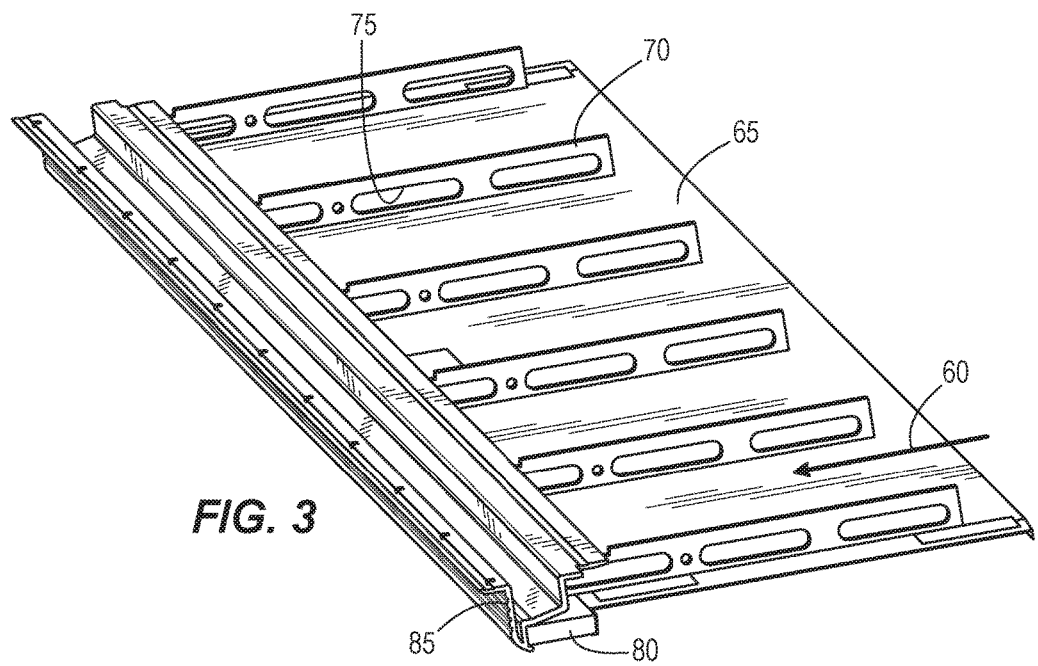
FIG. 3 is a perspective view of a holder and a portion of a top of the case of FIG. 1.

FIGS. 2 and 3 illustrate the construction of the top panel 20 that defines the second flow path 60. With reference to FIG. 3, the top panel 20 includes a surface 65 that defines the top of the display space 35 and a plurality of beam members 70 that support the surface 65. Each of the beam members 70 cooperates with an adjacent beam member 70 to define a portion of the second flow path 60 which extends from the rear of the case 10 toward the front. Each beam 70 also includes a plurality of open spaces 75 that allow for the recirculation of air between the beams 70.

A filter member 80 is coupled to and partially supported by the surface 65 and the beam members 70 and is positioned to discharge the cooled air into the display space 35. The filter member 80 includes a plurality of smaller openings and passages that aid in distributing the air flow, slowing the air flow, and filtering any large particulates that may be picked up in the air stream. In preferred constructions, the filter member 80 is a honeycomb member with other shapes and arrangements being possible.

A holder 85 includes two leg members 90, a substantially vertical wall 95, a pocket 100, and an angled wall 105. The holder 85 is formed as a single unitary component from a PVC (polyvinyl chloride) foam material. More preferably a closed-cell PVC foam is employed to form the holder 85 and assure the desired outer wall surface texture. The illustrated holder 85 is a thin-walled member that defines a substantially hollow space 110. However, other constructions may employ a solid holder or a holder 85 with thicker walls. The holder 85 attaches to a top 115 of the case 10 and at least partially supports the filter member 80 in its operating position.

The two leg members 90 are arranged horizontally to contact the top 115 of the case 10 to attach the holder 85 to the case 10. In the construction illustrated in FIGS. 4 and 5 the legs 90 extend the full length of the holder 85 with one leg 90 extending rearward toward the back of the case 10 and the second leg 90 extending toward the front of the case 10.

Figure 4:
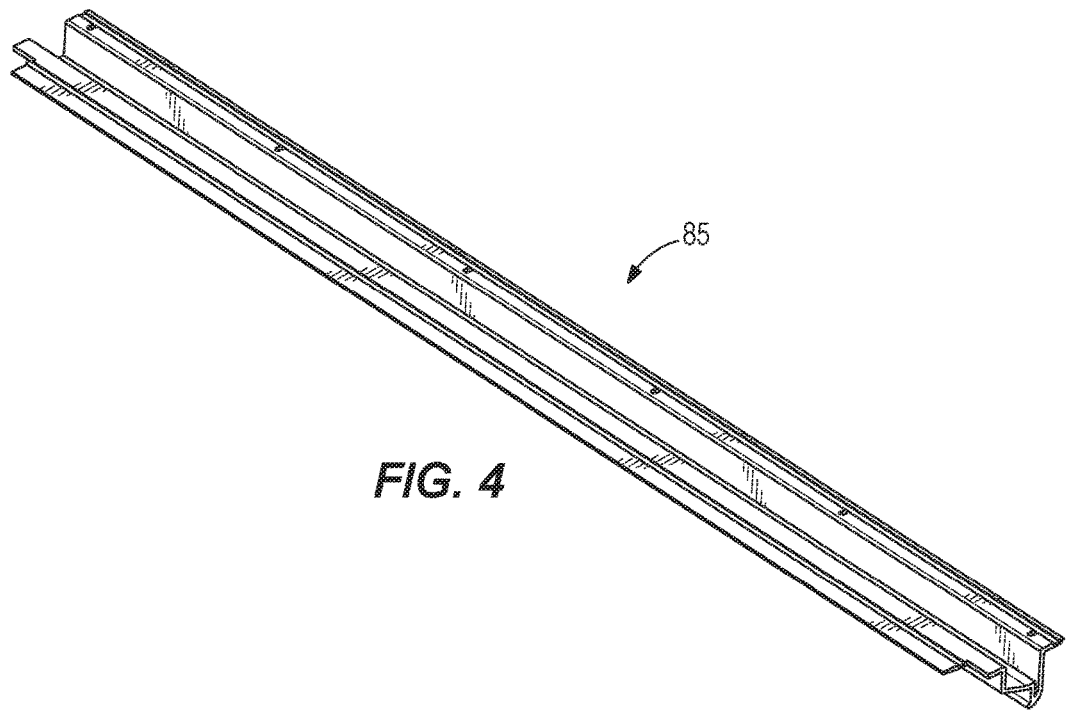
FIG. 4 is a perspective view of the holder of FIG. 2.
Figure 5:
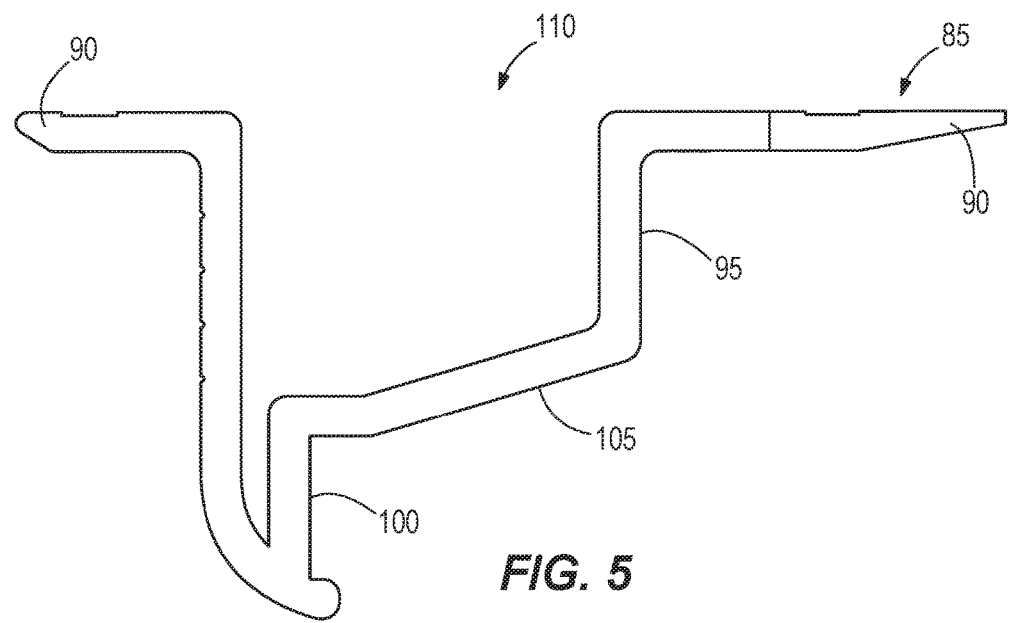
FIG. 5 is a side view of the holder of FIG. 4.

The pocket 100, better illustrated in FIGS. 4 and 5, is preferably elongated and extends the full length of the holder 85 to receive and hold the filter member 80. The vertical wall 95 extends downward from the rear leg 90 and abuts the beams 70 when in the installed position. The vertical wall 95 is substantially vertical (plus or minus 20 degrees) with other orientations and arrangements being possible.

The angled wall 105 extends between the pocket 100 and the vertical wall 95 and is arranged at an oblique angle with respect to the vertical wall 95. While the illustrated angled wall 105, as well as the vertical wall 95 is illustrated as substantially planar, other arrangements may include curved or contoured walls for one or both of the vertical wall 95 and the angled wall 105.

The vertical wall 95 and the angled wall 105 are arranged to redirect air passing between the beams 70 in a more downward direction through the filter element 80. More specifically, the vertical wall 95 and the angled wall 105 cooperate to define an air wedge 120 that both accelerates the air and redirects the air in a downward direction.

To install the holder 85, the legs 90 are first attached to the top 115 of the case 10. The attachment can be made using any suitable method including adhesives, fasteners, tabs and slots and the like. In some constructions, one of the legs 90 is sandwiched between a light assembly 125 and the top 115 of the case 10 to attach the leg 90 to the case 10. The opposite leg 90 is sandwiched between the beams 70 and the top 115 to hold it in place. As one of ordinary skill will realize, the attachment arrangement is not critical to the invention.

In operation, cool air flows along the paths between the beams 70 toward the holder 85. The vertical wall 95 and the angled wall 105 cooperate to define the air wedge 120 that forces the cool air into a more narrow space and turns the air in a downward direction. The reduction in flow area as the air enters the air wedge 120 produces a corresponding increase in the velocity of the air stream. The angle and size of the angled wall 105 can be varied to produce the desired direction of flow as well as the desired velocity. As the air turns downward, it passes through the filter member 80. The filter member 80 slows the air flow slightly, removes some of the flow turbulence as the air is directed more uniformly downward, and filters any large objects or debris from the air flow. The air then flows over the product being displayed to cool the product before being recirculated through the refrigeration system 40.

As one of ordinary skill will appreciate, the holder 85 provides substantial improvements over prior devices by eliminating metallic components that are poor insulators with a component that is an excellent insulator (low density PVC). In addition, the holder 85 can be shaped as desired to direct airflow while providing smoother transitions and less turbulence while also providing a decorative appearance. In addition, the one-piece holder eliminates several multi-piece components, thereby reducing air leakage and costs associated with manufacturing and assembly.

Various features and advantages of the invention are set forth in the following claims.

What is claimed is:

1. A refrigerated case comprising:
    a case body including a top panel, a rear panel, and a bottom that cooperate to define a display space;
    a portion of a refrigeration system disposed in the case and operable to cool a flow of air;
    a first air passage positioned to direct the flow of air near the top panel from the rear panel generally toward a front of the case;
    a one piece holder positioned to receive the flow of air adjacent the front of the case, the one piece holder formed as a unitary component using a polymeric foam material and providing an air wedge arranged to accelerate and redirect the flow of air in a downward direction toward the bottom; and
    an air flow straightener at least partially supported by the holder and positioned to receive the flow of air in the downward direction from the air wedge and to redirect that flow into the display space.

2. The refrigerated case of claim 1, wherein the portion of the refrigeration system includes an evaporator and a fan operable to move the flow of air through the evaporator.

3. The refrigerated case of claim 2, wherein the rear panel defines a second air passage that receives the flow of air from the evaporator and directs the flow of air to the first air passage.

4. The refrigerated case of claim 1, further comprising a plurality of beams adjacent the top panel and that cooperate to at least partially define the first air passage.

5. The refrigerated case of claim 4, wherein the top panel, the plurality of beams, the one piece holder, and the air flow straightener cooperate to define the air wedge that accelerates and redirects the flow of air in the downward direction.

6. The refrigerated case of claim 1, wherein the air flow straightener is a honeycomb member.

7. A refrigerated case comprising:
    a case body including a top panel, a rear panel, and a bottom that cooperate to define a display space;
    a portion of a refrigeration system disposed in the case and operable to cool a flow of air;
    a first air passage positioned to direct the flow of air near the top panel from the rear panel generally toward a front of the case;
    a polymeric foam holder member formed as a single unitary member and including a pocket portion, a substantially vertical surface and an angled surface arranged at an oblique angle with respect to the substantially vertical surface, the angled surface arranged to accelerate and redirect the flow of air in a downward direction toward the pocket portion; and
    an air flow straightener at least partially disposed within the pocket portion and partially supported by the holder, the air flow straightener positioned to receive the flow of air in the downward direction and to redirect that flow into the display space.

8. The refrigerated case of claim 7, wherein the portion of the refrigeration system includes an evaporator and a fan operable to move the flow of air through the evaporator.

9. The refrigerated case of claim 8, wherein the rear panel defines a second air passage that receives the flow of air from the evaporator and directs the flow of air to the first air passage.

10. The refrigerated case of claim 7, further comprising a plurality of beams adjacent the top panel and that cooperate to at least partially define the first air passage.

11. The refrigerated case of claim 10, wherein the top panel, the plurality of beams, the one piece holder, and the an air flow straightener cooperate to define an air wedge that accelerates and redirects the flow of air in the downward direction.

12. The refrigerated case of claim 7, wherein the an air flow straightener is a honeycomb member.

13. The refrigerated case of claim 7, wherein the holder member includes a surface oriented on an incline away from the first air passage toward a forward edge of the air flow straightener.

14. The refrigerated case of claim 7, wherein the air flow straightener also filters the flow of air.

15. The refrigerated case of claim 7, holder member provides a passage having a reduced cross-sectional area adjacent the first passage, and an increased cross-sectional area proximate the air flow straightener.

16. The refrigerated case of claim 1, wherein the one piece holder includes a surface oriented on an incline away from the first air passage toward a forward edge of the air flow straightener.

17. The refrigerated case of claim 1, wherein the air flow straightener also filters the flow of air.

18. The refrigerated case of claim 1, one piece holder provides a passage having a reduced cross-sectional area adjacent the first passage, and an increased cross-sectional area proximate the air flow straightener.

* * * * *